Patented Oct. 20, 1931

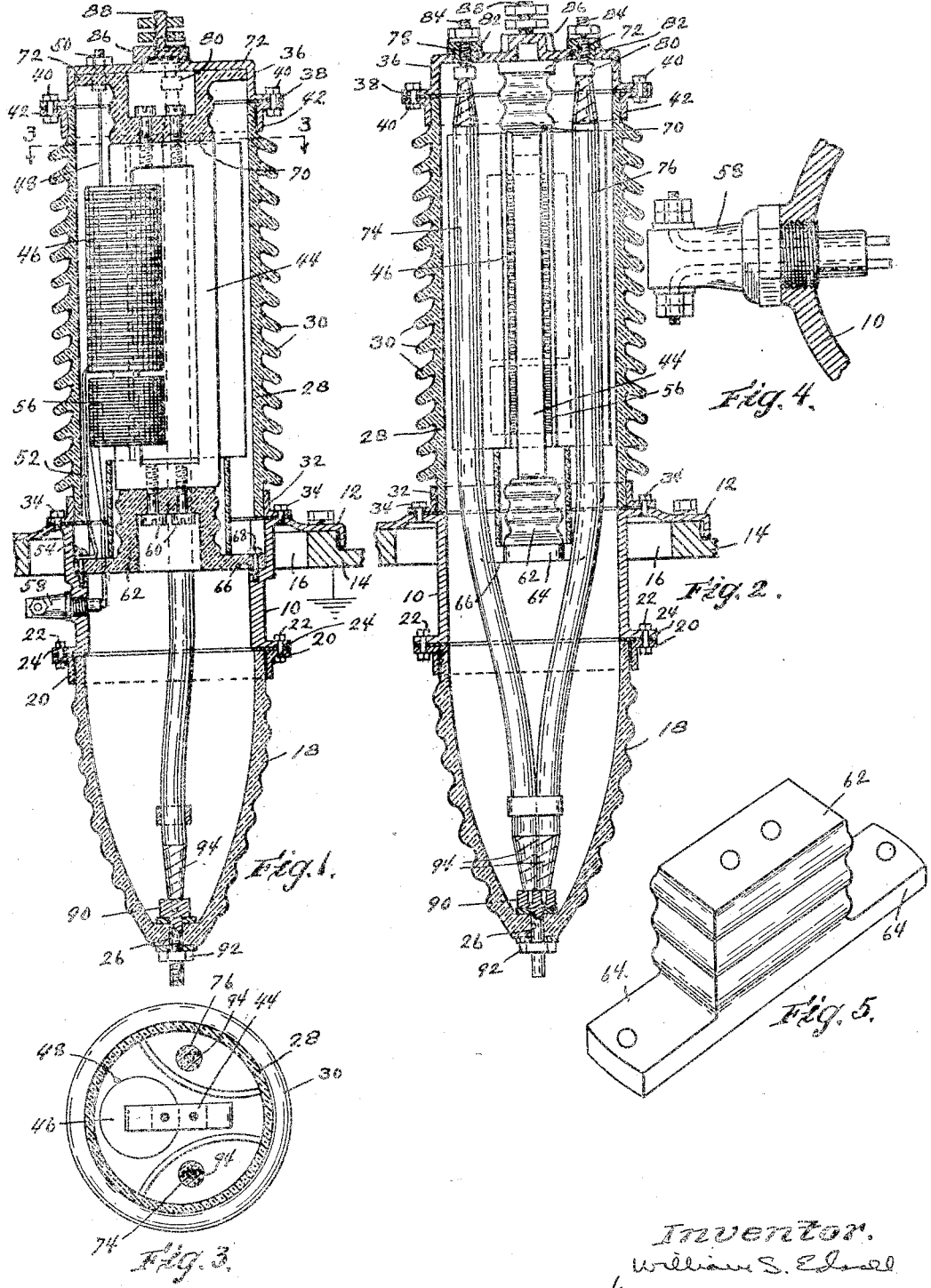

1,827,935

UNITED STATES PATENT OFFICE

WILLIAM S. EDSALL, OF BELMONT, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

INSULATING BUSHING

Application filed November 28, 1930. Serial No. 498,667.

This invention relates to electric high tension insulating bushings that are provided with means by which a low tension can be derived that is a function of the potential of the high voltage terminal of the bushing, for the actuation of synchronizing indicators and the like. The bushing is especially adapted to constitute one of the terminals of the synchronizing switch illustrated in the Jansson Patent No. 1,725,983.

Heretofore small amounts of power at low tensions have been derived from an insulating bushing by utilizing the electrostatic capacity and the potential drop between selected metal parts of the bushing. The amount of power that can be derived in this manner is very limited, however, and with the usual bushing is hardly enough positively to actuate a sensitive synchronoscope and is quite insufficient to supply additional power to metering instruments, switch tripping devices and the like, for which uses there is a demand. Furthermore, the voltage that is derived through the electrostatic capacity of the bushing is out of phase with the line voltage so that accessory phase-corrective devices and circuits are necessary particularly for use in synchronizing. These devices and circuits involve additional expense, a loss of power and are otherwise undesirable.

In recognition of the above objections to the capacity-transformer bushing it is an object of the present invention to provide an insulating bushing having means by which an abundant amount of low tension power, the potential of which varies in accordance with the potential of the high tension terminal of the bushing, can be derived from the high tension line connected to the high tension bushing, and with the low tension having such a desired phase relation with the high tension that corrective apparatus and circuits are unnecessary. In accomplishing this object an electromagnetic potential transformer is incorporated within the enclosing shell of the high tension bushing; and such a construction constitutes a further object of the invention.

The design of a high tension bushing which includes an electromagnetic potential transformer involves many difficulties of design that are not present in either the potential transformer or the bushing, each considered by itself. The dimensions of the bushings should not be varied materially from what is now considered standard practice as a change of dimensions necessitates a change in the design of the electrical apparatus, as a switch, of which the bushing is a component part. Thus the limitations imposed by the dimensions of the bushing materially affect the design of the potential transformer. Furthermore the presence of the high tension stud within the enclosing shell of the bushing imposes special conditions of insulation and construction both as regards the stud and the potential transformer. In general it is found that the stud must be displaced from its usual position in the axial line of the bushing; that the stud preferably should be flexible or at least capable of assuming a non-linear configuration and that preferably the stud should consist of a section of insulated high tension flexible cable; that the stud can well consist of two sections arranged in parallel on opposite sides of the transformer or at least parts thereof; and such construction comprises a further object of the invention.

Another object of the invention is generally to improve the construction of high tension insulating bushings having a low tension terminal.

Fig. 1 is a vertical section through the insulating bushing embodying the present invention.

Fig. 2 is a section taken at right angles to the section of Fig. 1.

Fig. 3 is a section taken along line 3—3 of Fig. 1.

Fig. 4 is a detail of the transformer secondary bushing.

Fig. 5 is a perspective view of the insulating and supporting block for the transformer.

As here shown the high tension bushing embodying the present invention includes the cylindrical metal shell or tube 10 which is open at the top and the bottom and has an outstanding flange 12 at its upper end which is adapted to be secured to the enclosing casing 14 of an electrical apparatus, as a switch, in which case the bushing constitutes one of the terminals of the switch. The metal shell 10 lies in the opening 16 of the casing and the flange 12 overlies the opening and constitutes a closure therefor. A porcelain shell 18 of inverted conical shape is attached to the lower open end of the metal shell 10 by means of an attaching flange 20 which is cemented to the top of said porcelain shell and bolts 22 which pass through said flange and an outstanding flange 24 at the lower end of said metal shell. The lower end of said porcelain shell is provided with an opening 26 through which a part of the conducting stud is extended as will be described hereinafter. A straight cylindrical shell 28 of porcelain or other suitable insulating material preferably having the peripherally outstanding capes or petticoats 30 thereon upstands above the open top of the metal shell in aligned relation therewith and is secured thereto by an attaching flange 32 which is cemented or otherwise secured to the bottom of said porcelain shell, and bolts 34 which pass through said attaching flange and into the flange 12 of said metal tube. The open top of the shell 28 is closed by a metal terminal cap 36 which has a radially outstanding flange 38 that is secured by bolts 40 to an attaching flange 42 that is secured by cement or otherwise to the top of said shell 28. The aforesaid parts constitute an insulating closure for the internal components of the bushing and potential transformer. The joints between the parts are made oil tight in any suitable manner and the casing is adapted to contain an insulating medium as oil to a suitable height and preferably to a level above the joint between the flanges 38 and 42.

An electromagnetic potential transformer is located within said casing and immersed in and insulated by the oil thereof. The transformer preferably is located mainly within the straight insulating shell 28 and above the metal shell 10. The transformer includes a magnetic core 44 of elongated rectangular configuration which extends vertically within the shell 28 and co-axially therewith and has a height approximating that of said shell. A high tension or primary winding 46 is arranged on one leg only of said core. The high tension terminal 48 of said primary winding is extended upwardly and is connected to a connector 50 that is secured electrically and mechanically to the cap 36. The low or ground tension lead 52 of said primary winding is attached by suitable means, as the bolt 54, to the metal shell 10, which is at ground potential since the casing 14 is usually grounded. The primary winding is thus connected directly between the ground and the high tension terminal of the bushing, namely the cap 36, and thus to the high tension line that is adapted to be connected with the cap. The same leg of the transformer that carries the primary winding also is provided with a low tension winding 56, the terminals of which are let out through an oil tight insulated bushing 58 that is secured in the side wall of the shell 10 under the flange 12. The mid point of the primary winding 46 is connected electrically to the core 44 so that the core is at one-half the potential that exists between the high tension terminal cap 36 and the low tension ground sleeve or tube 10. Thus the insulation between the primary winding and the core need only be that necessary for half the line voltage. Consequently difficulties of insulation of the transformer are materially reduced.

The core is supported by and insulated from the metal sleeve 10. To this end the core is secured in any suitable manner, as the bolts 60 or otherwise, to an insulating block 62 that extends downwardly below the core and has outstanding flanges 64 that rest upon inwardly extended opposed shelves 66 of the shell 10 and are secured thereto by bolts 68. The core also is preferably supported by the cap 36 by means of an insulating block 70 that is secured to the top of the core and has outstanding arms 72 that engage the cylindrical section of the cap 36 so that the upper end of the core is supported against lateral displacement. The insulating block 70 need not be secured rigidly to the cap. With this arrangement ample insulation of the transformer is provided without an undue enlargement of the diameter of the enclosing shell of the bushing and also without any material increase in the length of the bushing. At the same time the transformer can supply an abundant amount of low tension power at the terminals of the low tension secondary winding 56; and the potential of said winding is a function of the potential of the high tension line connected to the terminal cap 36, and varies with said potential and is in phase therewith. By having the transformer long in the axial direction of the bushing ample space is provided between the core of the transformer and the outer shell of the bushing in which to locate a high tension stud. Preferably, however, two similar high tension studs 74 and 76 are employed. Said studs are extended lengthwise of the bushing on opposite sides of the transformer core 46, so that the transformer core lies between them. Said studs preferably are parallel adjacent the transformer, and thereabove, and the upper ends are separately connected to connectors 78 and 80, which, in turn, are connected electrically and mechanically by means including bushings 82 and bolts 84, to the terminal cap 36 on opposite sides of the middle of said cap. Said cap, between said connectors, is provided with a boss 86 and a stud 88 to which the high tension conductor is secured. The symmetrical arrangement of the bushing studs and the terminal stud permits an equal current distribution in the bushing studs. Under the transformer the studs 74 and 76 are drawn together, as best shown in Fig. 2, so that they extend downwardly in close parallel relationship in the lower porcelain shell 18. The lower ends of the studs are connected to a terminal connector 90 that passes through the opening 26 in the bottom of the shell 18 and externally of the shell where it is provided with suitable means for connection with electrical apparatus within the casing 14; or it may carry the contact terminal, not shown, of an electric switch. The stud 90 is externally screw threaded and is secured in the opening 26 and in fluid sealing relation with said opening by means including a clamping nut 92. The studs carry suitable insulation 94 which may be of any suitable character as an insulating tape which is wrapped upon the studs, or other insulating material. The insulation preferably is continuous between the ends of the studs or at least it overlies the studs in the region of the transformer and shell 10. Preferably the studs comprise sections of flexible high tension electric cable, as the cable art has progressed to a point where high dielectric strength for relatively small thickness of solid insulation is readily obtained and wherein the dielectric and the conductor are flexible so that the studs with the insulation thereon can readily be bent into the configuration illustrated. The two cable studs herein shown are preferred to one alone not only because the stud capacity of the bushing is approximately doubled but also because the electrostatic stresses between the various parts is more symmetrical.

I claim:

1. A high tension bushing having an insulating shell provided with terminals at the ends thereof and an intermediate ground terminal, a stud extended through said shell and connecting said end terminals, and a potential transformer contained within said shell out of contact with said stud and having a primary winding that has a high tension terminal electrically connected with one of said end terminals and a low tension terminal that is connected with said ground terminal, and a low tension secondary winding having terminals extended through said shell, the potential of said low tension winding varying in accordance with the potential of a high tension terminal of said bushing.

2. A high tension bushing having an insulating enclosing shell, terminals at the ends of the shell one of which constitutes the high tension terminal of the bushing, a stud located within and connecting said terminals, and a potential transformer located within said shell having a high tension primary winding that is structurally independent of said stud and has a high tension lead terminal that is connected electrically with said high tension bushing terminal, and having a secondary winding that has a terminal extended externally of said shell and is subject to a potential that is lower than and varies with the potential of said high tension bushing terminal.

3. A high tension insulating bushing having an insulating enclosing shell, terminals at the ends of said shell one of which constitutes a high tension terminal for the bushing, a potential transformer located within said shell having a primary winding that has its high tension terminal connected with said high tension bushing terminal and a low tension secondary winding that has a low tension lead extended externally of said shell, and a stud which is extended lengthwise and internally of said shell independent of said transformer and electrically spaced therefrom and which connects said bushing terminals.

4. A high tension insulating bushing having an insulating enclosing shell, terminals at the ends of said shell one of which constitutes a high tension terminal for the bushing, a potential transformer located within said shell having a primary winding that has its high tension terminal connected with said high tension bushing terminal and a low tension secondary winding that has a low tension lead extended externally of said shell, and a stud which is extended lengthwise and internally of said shell independent of said transformer and electrically spaced therefrom and which connects said bushing terminals.

5. A high tension insulating bushing having an elongated insulating enclosing shell, terminals at the ends of said shell, a potential transformer located within said shell having an elongated magnetic core which extends lengthwise of said shell, and having a high tension primary winding that has a high tension lead that is connected electrically with a bushing terminal, and a low tension secondary winding that has a low tension lead extended internally of said shell, and a stud which is extended lengthwise and internally of said shell and lengthwise of said magnetic core and which connects said bushing terminals.

6. A high tension insulating bushing as defined in claim 5 wherein said core is in the axial line of said bushing and wherein said stud is at one side of said axial line and lies between said core and the wall of said enclosing shell.

7. A high tension insulating bushing comprising an enclosing shell having terminals at the ends thereof, a potential transformer located within said shell and having a high tension primary winding that has a high tension terminal connected electrically with one of said bushing terminals and a low tension secondary winding that has a low tension lead extended externally of said shell, and a stud which extends lengthwise of said shell and connects said bushing terminals and is independent of said transformer and is bent to avoid said transformer.

8. A high tension insulating bushing comprising an insulating enclosing shell having terminals at the ends thereof, a potential transformer located within said shell in the line of said terminals and having a high tension primary winding that has a high tension terminal connected with one of said bushing terminals, and a low tension winding having a low tension lead extended externally of said shell, and a stud which is extended lengthwise and internally of said shell and connects said bushing terminals and is bent to avoid said transformer.

9. A high tension insulating bushing including an insulating enclosing shell having terminals at the ends thereof, a potential transformer located within said shell having a high tension primary winding that has a high tension terminal connected with one of said bushing terminals and a low tension secondary winding having a low tension lead extended externally of said bushing, and a flexible stud that is extended lengthwise and internally of said shell and connects said bushing terminals.

10. A high tension insulating bushing including an insulating enclosing shell having terminals at the ends thereof, a potential transformer located within said shell having a high tension primary winding that has a high tension terminal connected with one of said bushing terminals and a low tension secondary winding having a low tension lead extended externally of said bushing, and a flexible stud that is extended lengthwise and internally of said shell and connects said bushing terminals, said flexible stud being bent around said transformer.

11. A high tension insulating bushing including an insulating enclosing shell having terminals at the ends thereof, a potential transformer located within said shell having a high tension primary winding that has a high tension terminal connected with one of said bushing terminals and a low tension secondary winding having a low tension lead extended externally of said bushing, and a flexible stud that is extended lengthwise and internally of said shell and connects said bushing terminals, said flexible stud being bent around said transformer and insulation carried by said studs and the bent portions thereof.

12. A high tension insulating bushing including an insulating enclosing shell having terminals at the ends thereof, a potential transformer located within said shell having a primary winding that has a high tension terminal connected with one of said bushing terminals and a low tension secondary winding that has a low tension lead extended externally of said bushing, and a stud comprising a section of an insulated flexible high tension cable that is extended lengthwise of said shell and connects said bushing terminals.

13. A high tension insulating bushing including an insulating enclosing shell having terminals at the ends thereof, a potential transformer located within said shell having a primary winding that has a high tension terminal connected with one of said bushing terminals and a low tension secondary winding that has a low tension lead extended externally of said bushing, and a stud comprising a section of an insulated flexible high tension cable that is extended lengthwise of said shell and connects said bushing terminals, said cable having parts which are longitudinally offset so as to avoid said transformer.

14. A high tension insulating bushing including an insulating enclosing shell having terminals at the ends thereof, a potential transformer located within said shell in the axial line thereof having a primary winding that has a high tension terminal connected with one of said bushing terminals and a low tension secondary winding that has a low tension lead extended externally of said bushing, and a flexible insulated high tension cable extended longitudinally within said shell and connecting said terminals, said cable having a part which is in the axial line of said bushing and another part which is offset from said axial line where said cable passes by said transformer.

15. A high tension insulating bushing including an insulating enclosing shell having terminals at the ends thereof, a transformer located within said shell, and a pair of studs extended longitudinally of said shell and on opposite sides of said transformer and connecting said bushing terminals.

16. A high tension insulating bushing including an insulating enclosing shell having terminals at the ends thereof, a transformer located within said shell, and a pair of studs extended longitudinally of said shell and on opposite sides of said transformer and connecting said bushing terminals, said studs being in proximity beyond said transformer and being spaced apart at said transformer.

17. A high tension insulating bushing including an insulating enclosing shell, a potential transformer located within said shell having a primary winding that has a high tension terminal connected with one of said bushing terminals and a low tension secondary winding having a low tension lead that is extended externally of said bushing, and a pair of flexible studs that are extended lengthwise and internally of said shell on opposite sides of said transformer and that connect said bushing terminals.

18. A high tension insulating bushing including an insulating enclosing shell, a potential transformer located within said shell having a primary winding that has a high tension terminal connected with one of said bushing terminals and a low tension secondary winding having a low tension lead that is extended externally of said bushing, and a pair of flexible studs that are extended lengthwise and internally of said shell on opposite sides of said transformer and that connect said bushing terminals, said flexible studs comprising sections of flexible insulating high tension cable.

19. A high tension insulating bushing including an insulating enclosing shell having a terminal at one end and a cap at the other end which constitutes another terminal, a potential transformer located within said shell having a high tension primary winding that has a high tension terminal connected with said cap and a low tension secondary winding that has a low tension lead extended externally of said shell, and a pair of studs that are extended longitudinally and internally of said shell on opposite sides of said transformer and have a common connection with said first mentioned bushing terminal and separate connections with said cap.

20. A high tension insulating bushing as defined in claim 19 wherein said transformer has a magnetic core that is elongated axially of said bushing and is located between and is parallel with said studs.

21. A high tension insulating bushing comprising an intermediate metal tube, insulating shells secured to the top and bottom of said metal tube, a potential transformer located within and extended axially of said upper shell, insulating means supporting said transformer from said metal shell, terminals carried by said upper and lower shells, said transformer having a primary winding one terminal of which is connected to said upper terminal and the other terminal of which is connected to said metal tube and a low tension secondary winding having a low tension lead extended externally of said bushing, and a stud which is extended longitudinally and internally of said bushing at one side of said transformer and connects said upper and lower bushing terminals.

22. A high tension insulating bushing including an enclosing shell comprising an intermediate metal tube, upper and lower insulating tubes connected with the upper and lower ends of said shell, a terminal at the bottom of said lower tube, a cap on the upper end of said upper tube also constituting a terminal, a transformer located at least mainly within said upper shell and having a core that is elongated axially of said shell having a primary winding that is connected between said cap and said metal tube and a low tension secondary winding that has a lead extended externally of said shell, insulating means supporting said core from said metal tube, and an insulated stud extended longitudinally and internally of said shell at one side of said transformer and connecting said terminal and cap.

23. A high tension insulating bushing including an enclosing shell comprising an intermediate metal tube, upper and lower insulating tubes connected with the upper and lower ends of said shell, a terminal at the bottom of said lower tube, a cap on the upper end of said upper tube also constituting a terminal, a transformer located at least mainly within said upper shell and having a core that is elongated axially of said shell having a primary winding that is connected between said cap and said metal tube and a low tension secondary winding that has a lead extended externally of said shell, insulating means supporting said core from said metal tube, and a pair of insulated studs extended longitudinally and internally of said shell on opposite sides of said transformer and connecting said lower terminal and cap.

24. A high tension insulating bushing including an enclosing shell comprising an intermediate metal tube, upper and lower insulating tubes connected with the upper and lower ends of said shell, a terminal at the bottom of said lower tube, a cap on the upper end of said upper tube also constituting a terminal, a transformer located at least mainly within said upper shell and having a core that is elongated axially of said shell having a primary winding that is connected between said cap and said metal tube and a low tension secondary winding that has a lead extended externally of said shell, insulating means supporting said core from said metal tube, and a pair of insulated studs extended longitudinally and internally of said shell on opposite sides of said transformer and connecting said lower terminal and cap, said studs having a common connection with said lower terminal and separate connections with said cap.

25. A high tension insulating bushing including an enclosing shell comprising an intermediate metal tube, upper and lower insulating tubes connected with the upper and lower ends of said shell, a terminal at the bottom of said lower tube, a cap on the upper end of said upper tube also constituting a terminal, a transformer located at least mainly within said upper shell and having a core that is elongated axially of said shell having a primary winding that is connected between said cap and said metal tube and a low tension secondary winding that has a lead extended externally of said shell, insulating means supporting said core from said metal tube, and a pair of insulated studs extended longitudinally and internally of said shell on opposite sides of said transformer and connecting said lower terminal and cap, said studs being flexible.

26. A high tension insulating bushing including an enclosing shell comprising an intermediate metal tube, upper and lower insulating tubes connected with the upper and lower ends of said shell, a terminal at the bottom of said lower tube, a cap on the upper end of said upper tube also constituting a terminal, a transformer located at least mainly within said upper shell and having a core that is elongated axially of said shell having a primary winding that is connected between said cap and said metal tube and a low tension secondary winding that has a lead extended externally of said shell, insulating means supporting said core from said metal tube, and a pair of insulated studs extended longitudinally and internally of said shell on opposite sides of said transformer and connecting said lower terminal and cap, said studs being flexible, and each consisting of a section of high tension insulated cable.

27. The combination of an insulating shell that is open at its opposite ends and has a terminal-forming cap on one end, a transformer located within said shell and having a winding that is connected to said terminal, and an insulated conductor that extends through said shell and alongside said transformer and has a connection with said terminal, and a support for said conductor that constitutes a closure for the other end of said shell.

28. The combination of an insulating shell having a supporting base at the bottom and a high tension terminal at the top, a transformer located within said shell and having a magnetic core which is elongated lengthwise of said shell, primary and secondary windings on said core, said primary winding being connected with said terminal, and an insulated conductor extended through said core alongside said transformer and having a connection with said terminal.

29. The combination of an insulating shell having a supporting base at the bottom and a high tension terminal at the top, a transformer located within said shell and having a magnetic core which is elongated lengthwise of said shell, primary and secondary windings on said core, said primary winding being connected with said terminal, and a pair of insulated conductors extended through said shell alongside and on opposite sides of said transformer and having connections with said shell.

In testimony whereof, I have signed my name to this specification.

WILLIAM S. EDSALL.